United States Patent [19]

Miljoen

[11] 4,390,353

[45] Jun. 28, 1983

[54] FILTER APPARATUS

[75] Inventor: Rodney W. Miljoen, Berowra Waters, Australia

[73] Assignee: James Howden Australia Pty. Limited, Australia

[21] Appl. No.: 263,482

[22] Filed: May 14, 1981

[51] Int. Cl.³ ............................................. B01D 46/04
[52] U.S. Cl. ........................................ 55/304; 55/378
[58] Field of Search ................. 55/147, 148, 304, 378, 55/379, 507, 508, 509; 210/323.2, 413

[56] References Cited

U.S. PATENT DOCUMENTS

| | | | |
|---|---|---|---|
| 1,628,601 | 5/1927 | Feind | 55/304 |
| 2,014,298 | 9/1935 | Schneible | 55/304 |
| 4,217,117 | 8/1980 | Syverson | 55/304 |
| 4,242,114 | 12/1980 | Deacon | 55/304 |
| 4,247,314 | 1/1981 | Smoluchowski et al. | 55/304 |

FOREIGN PATENT DOCUMENTS

| | | | |
|---|---|---|---|
| 2915958 | 3/1980 | Fed. Rep. of Germany | 55/304 |
| 902963 | 8/1962 | United Kingdom | 55/304 |
| 565692 | 7/1977 | U.S.S.R. | 55/304 |
| 670316 | 6/1979 | U.S.S.R. | 55/304 |
| 713578 | 2/1980 | U.S.S.R. | 55/304 |

Primary Examiner—David L. Lacey

[57] ABSTRACT

A filter apparatus for filtering particulate matter from gas streams and which comprises a shaker rack suspended from a frame and supporting a plurality of filter bags and means to cause the rack to move reciprocally along a linear path wherein the shaker rack is suspended from the frame by a plurality of leaf springs which lie in parallel planes which planes are normal to the said linear path. The arrangement stops shimmying of the shaker rack during its reciprocal movement.

7 Claims, 4 Drawing Figures

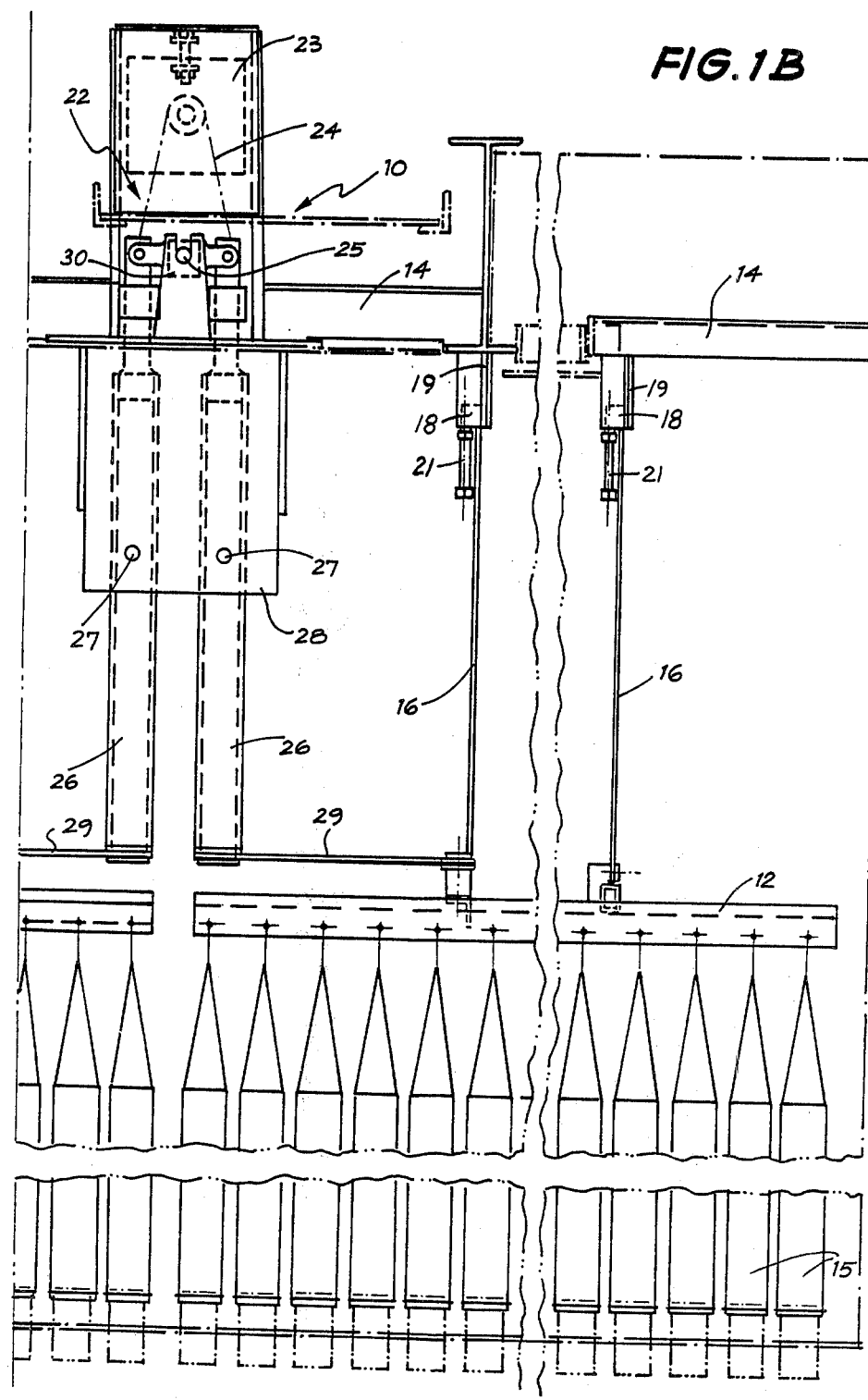

FILTER APPARATUS

The present invention relates to a filter apparatus and more particularly to a filter apparatus of the shaker type wherein novel means are provided for the suspension of the shaker rack from the frame of the filter apparatus.

Filter apparatus are designed to remove particulate matter from gas streams. In such apparatuses the filter medium is formed in the shape of an elongate tubular bag. In one form such filtering apparatuses are cleaned by shaking the filter bags in the absence of a gas stream passing through the bag such that particulate matter trapped by the filter medium is caused to fall downwardly out of the bag before subsequent discharge from the filtering apparatus housing. Filter apparatus of the type in which the filter medium is cleaned by being shaken are known as filtering apparatuses of the shaker type.

Conventionally filtering apparatuses of the shaker type comprise a shaker rack adapted to support the upper ends of a plurality of filter bags and suspended from a frame of the filter apparatus by a plurality of parallel motion linkages, each of which comprises a link bar which is connected through a bearing at its upper end to the frame of the filter apparatus and which is connected through a bearing at its lower end to the shaker rack. Means are provided to reciprocate the rack along a path at right angles to the axis of the bearings. It has been found that this arrangement has the disadvantage that it is difficult to limit the motion of the shaker rack such that it moves solely in the desired direction. There is a tendency when the bearings have become worn for the shaker rack to shimmy i.e. to move along an ellipical path.

The present invention provides a filter apparatus of the shaker type which is less susceptible to wear and the consequent requirement of maintenance and which is less susceptible to shimmying in use.

The present invention consists in a filtering apparatus comprising a frame, a shaker rack suspended from the frame and adapted to support a plurality of filter bags, and means for causing the shaker rack to move reciprocally along a path lying in one plane, the shaker rack being suspended from the frame by a plurality of leaf springs which lie in parallel planes, which planes are normal to the plane containing the said path.

In a further aspect the present invention consists in a filtering apparatus comprising a housing, a pair of shaker racks disposed within the housing and suspended such that they may each move reciprocally along a path, which path lies in a single plane, a plurality of filter bags suspended from each rack and means to move the racks along the said paths characterized in that the racks are caused to move in opposite directions along their respective paths.

The leaf springs are preferably bolted to vertically extending lugs or plates on the frame and the shaker rack. The shaker rack is preferably square or rectangular in shape and so arranged that the leaf springs are normal to the longitudinal axis of the rack. In a preferred embodiment of the invention the shaker rack is suspended by two pairs of leaf springs each pair being spaced apart along a line parallel to one edge of the shaker rack and the springs of each pair lying in the same plane. The planes being parallel to one another and spaced apart along the other edge of the shaker rack. The dimensions of the springs can be selected according to the weight to be carried by the shaker rack and the amplitude of the oscillations imparted to the shaker rack.

The use of the leaf springs to suspend the shaker rack from the frame allows the shaker rack to be oscillated with little resistance in the direction of oscillations but with a very high resistance in directions transverse to the direction of oscillation.

If desired one end of each of the leaf springs may be connected to the shaker rack or the frame through height adjustment means which can be used to vary the vertical distance between the shaker rack and the frame. In one such embodiment the upper end of each leaf spring is bolted to a plate, which plate can be raised or lowered relative to the frame by threaded bolt means.

The means to cause the shaker rack to move reciprocally along the path preferably comprises a motor mounted on the frame which drives a shaft which is provided with an eccentric bearing which imparts a reciprocal motion to a vertically extending rod which is pivoted to the frame at its mid-point and connected through a link arm at its lower end to the shaker rack to impart reciprocal motion to the shaker rack. In a particularly preferred embodiment of the invention the link arm connecting the lower end of the vertically disposed rod and the shaker rack is a leaf spring longitudinally aligned with the direction of movement of the shaker rack. This latter arrangement allows differential movement in a vertical direction of the rack swing but provides high resistance to horizontal movement.

It is preferred that the racks are mounted in pairs and that the means provided to cause reciprocal movement of the racks is so arranged that the racks in each pair move in opposite directions to minimize out of balance forces due to the rack motion.

Hereinafter given by way of example is a preferred embodiment of the present invention described with reference to the accompanying drawings in which:

FIGS. 1A and 1B are together a part side elevational view of a filtering apparatus which embodies the present invention.

Figure 1A:
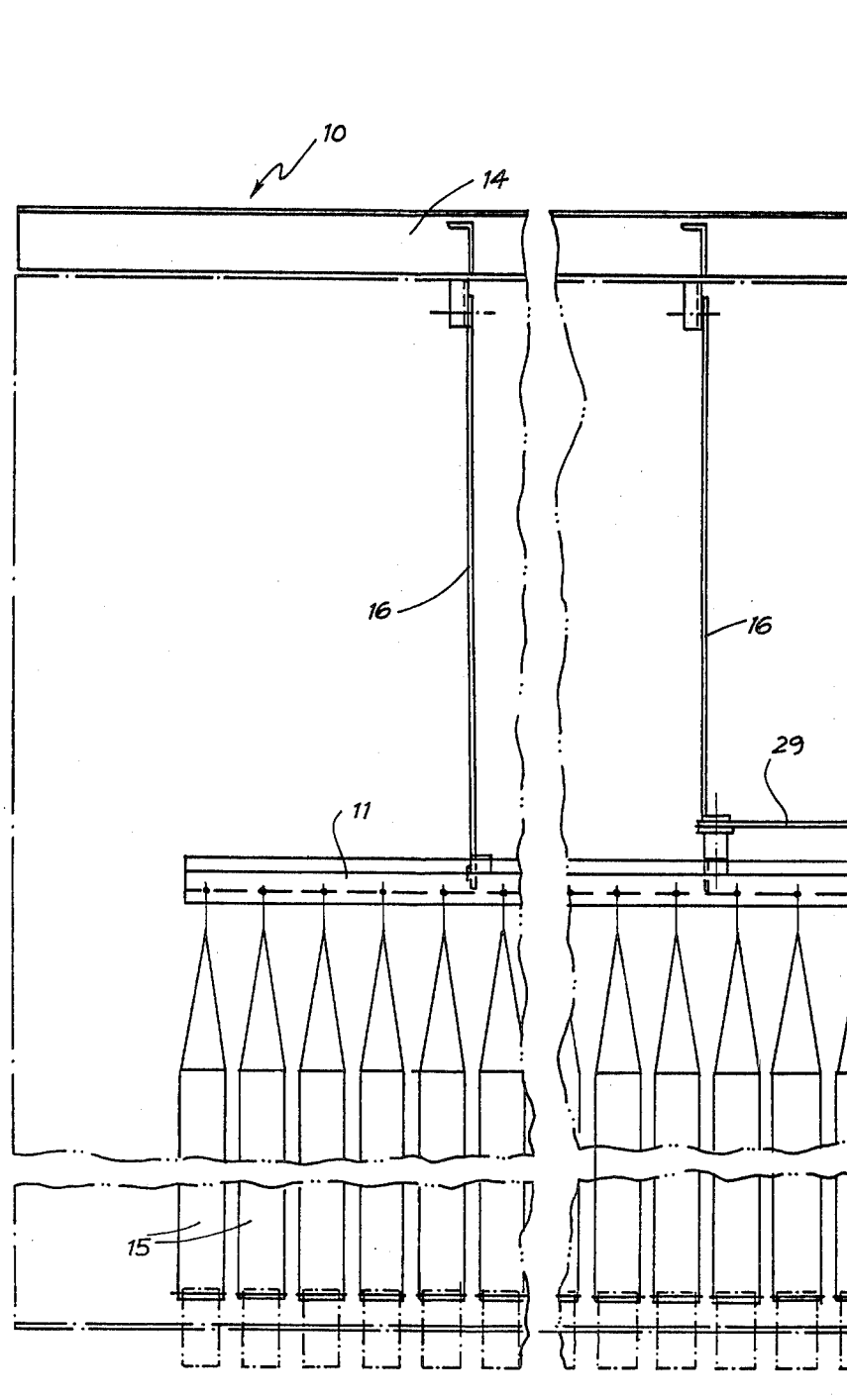
Figure 2A:
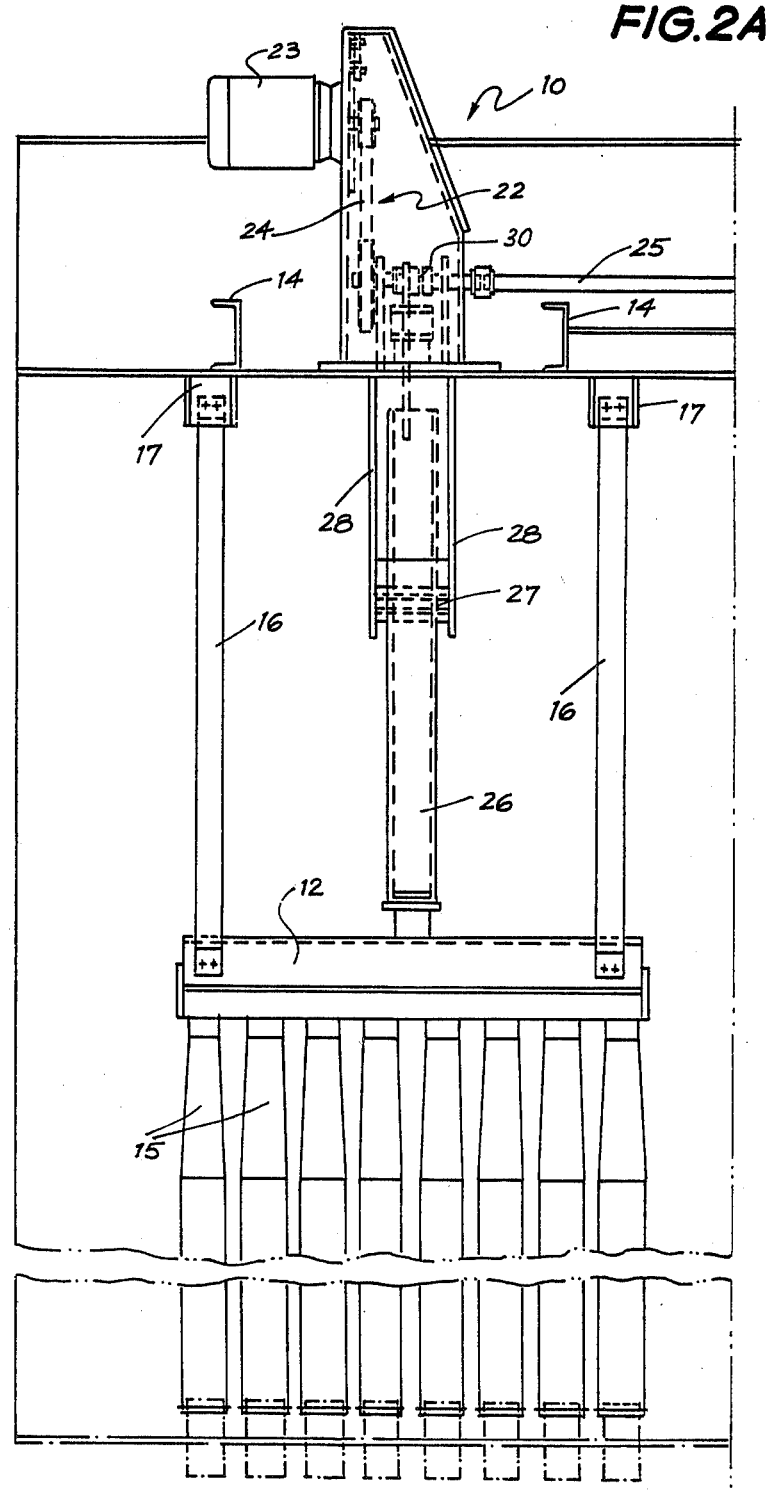
FIGS. 2A and 2B are an end elevational view of the filtering apparatus of FIGS. 1A and 1B.
Figure 2B:
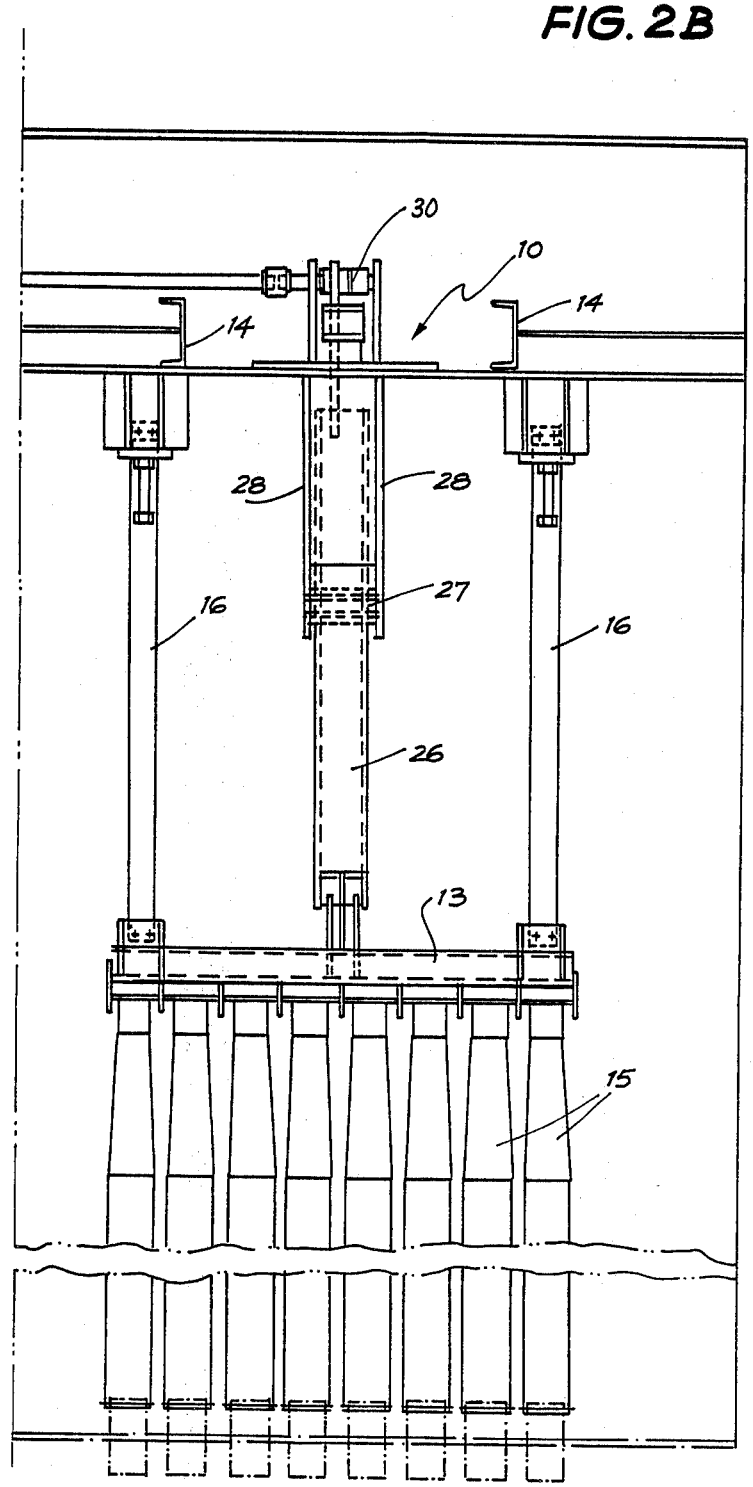

The filter apparatus 10 comprises four shaker racks of which three 11, 12 and 13 are seen, which are each suspended from an array of girders 14 forming part of the frame work of a filtering apparatus baghouse (not shown).

Each of the shaker racks 11, 12 and 13 comprises a rectangular frame arranged to support an array of filter bags 15. Each rack is suspended from the array of girders 14 by two pairs of leaf springs 16. The leaf springs 16 of each pair are arranged in spaced apart array in a common plane and the planes containing the two pairs of leaf springs 16 are spaced apart along the length of the associated rack 11, 12 or 13. At their lower ends each spring 16 is welded to the associated rack 11, 12 or 13 while at their upper ends the springs are either welded to a bracket 17 which in turn is welded to one of the girders 14 or are welded to an L-shaped bracket 18 which is slidably mounted in bracket 19 which is welded to one of the girders 14. In the latter arrangement an adjustment bolt 21 is mounted in a threaded hole in the bracket 18 such that its free end bears on the L-shape bracket 18 such that rotation of bolt 21 will cause the L-shaped bracket 18, and the spring 16 attached thereto, to be raised or lowered relative to the bracket 19. In this way the racks 11, 12 or 13 to which the spring 16 is connected can be levelled.

The racks 11, 12 and 13 mounted in the above manner can be caused to oscillate along a linear path by the flexure of the leaf springs 16. An oscillator mechanism 22 is provided on the girders 14 to induce the racks 11, 12 and 13 to so oscillate. The oscillator mechanism 22 comprises an electric motor 23 which, through belt 24, drives shaft 25. Eccentric bearings 30 (shown diagrammatically) mounted at either end of the shaft 25 are operatively connected to the upper ends of shafts 26. Each shaft 26 is pivotally mounted at its mid-point on a pin 27 supported by plates 28 such that is can pivot in a plane parallel to the reciprocating axis of an associated rack 11, 12 or 13. The lower end of each shaft 26 is connected to its associated rack 11, 12 or 13 by a leaf spring 29 such that the pivotal movement of the shaft 26 is converted to a reciprocal motion in the associated rack 11, 12 or 13. Each shaft 26 is connected at its upper end by a separate eccentric bearing 30. The eccentric bearings 30 for each pair of axially aligned racks are offset by 180° such that upon rotation of the shaft 25 the upper ends of the shafts 26 associated with that pair of racks will move in opposite directions. The pair of aligned racks connected to the shafts 26 will reciprocate in opposition to one another.

I claim:

1. Filter apparatus for filtering particulate matter from a gas stream comprising a frame, a shaker rack suspended from the frame, a plurality of filter bags suspended vertically from the shaker rack, and shaker means for causing the shaker rack to move reciprocally along a path lying substantially in one plane, said shaker rack being suspended from the frame by a plurality of leaf springs which lie in parallel planes, which planes are normal to the plane containing the path of reciprocation of the shaker rack.

2. Filter apparatus as claimed in claim 1, in which vertically extending brackets are provided on the frame, said leaf springs being connected to said brackets.

3. Filter apparatus as claimed in claim 1, in which the plurality of leaf springs suspending the shaker rack comprise two pairs of leaf springs, each pair being spaced apart along a line parallel to one edge of the shaker rack, the springs of each pair lying in a common plane.

4. Filter apparatus as claimed in claim 1, in which at least some of the leaf springs are connected to the frame through height adjustment means such that the vertical distance between the shaker rack and the frame may be varied.

5. Filter apparatus as claimed in claim 1, in which the shaker means comprises a motor mounted on the frame, a shaft provided along its length with an eccentric bearing rotatably driven by said motor, a vertically extending rod pivotably connected to said frame intermediate its ends, said bearing imparting a reciprocal motion to one end of said rod, a link arm, and said rod being connected at its other end to the shaker rack through said link arm.

6. Filter apparatus as claimed in claim 5, in which the link arm comprises a leaf spring longitudinally aligned with the plane of reciprocation of the shaker rack.

7. Filter apparatus as claimed in claim 1, in which there is provided a second shaker rack suspended from the frame, a plurality of filter bags suspended vertically from the second shaker rack, said shaker racks being suspended by said leaf springs in longitudinal alignment and in substantially the same plane, and said shaker means being so arranged that the shaker racks are moved in opposite directions as they reciprocate.

* * * * *